United States Patent
Aizawa

(10) Patent No.: US 6,302,500 B1
(45) Date of Patent: Oct. 16, 2001

(54) DEVICE FOR DETECTING VEHICLE SPEED OF FOUR-WHEELED VEHICLES FOR USE IN ABS

(75) Inventor: Hideyuki Aizawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/389,065

(22) Filed: Sep. 2, 1999

(30) Foreign Application Priority Data

Oct. 8, 1998 (JP) .................................................. 10-286959

(51) Int. Cl.$^7$ ...................................................... B60T 8/72
(52) U.S. Cl. ............................. 303/173; 303/168; 303/3; 303/171; 701/1
(58) Field of Search ................................ 303/3, 168, 170, 303/173, 169, 171, 172, 177

(56) References Cited

U.S. PATENT DOCUMENTS

| | | |
|---|---|---|
| 3,910,644 * | 10/1975 | Packer . |
| 4,787,682 | 11/1988 | Muto . |
| 4,989,923 * | 2/1991 | Lee et al. .............................. 303/109 |
| 5,181,174 | 1/1993 | Matsuda et al. . |
| 5,185,702 | 2/1993 | Okubo . |
| 5,233,529 | 8/1993 | Braschel et al. . |
| 5,240,313 | 8/1993 | Yoshino et al. . |
| 5,303,988 | 4/1994 | Okubo . |
| 5,312,171 | 5/1994 | Schafer . |
| 5,401,081 * | 3/1995 | Sakane ................................. 303/103 |
| 5,414,628 | 5/1995 | Yoshino . |
| 5,428,540 | 6/1995 | Okubo . |
| 5,430,652 | 7/1995 | Fujioka . |
| 5,522,652 * | 6/1996 | Negrin et al. ......................... 303/154 |
| 5,642,280 * | 6/1997 | Negrin et al. ............................ 701/1 |
| 5,644,490 | 7/1997 | Weber . |
| 6,142,587 * | 11/2000 | Ohtsu ................................... 303/167 |

FOREIGN PATENT DOCUMENTS

| | | |
|---|---|---|
| 0240287 * | 7/1987 | (EP) . |
| 0 348 072 A2 | 12/1989 | (EP) . |
| 0522565 * | 1/1993 | (EP) . |
| 1 592 932 | 7/1981 | (GB) . |
| A-6-144187 | 5/1994 | (JP) . |
| A-8-192730 | 7/1996 | (JP) . |

\* cited by examiner

*Primary Examiner*—J. J. Swann
*Assistant Examiner*—David Divine
(74) *Attorney, Agent, or Firm*—Oliff & Berridge, PLC

(57) ABSTRACT

In order to obtain the vehicle speed of an ordinary automobile operating with a pair of drive wheels and a pair of driven wheels, so as to provide the base of a due slipless rotation speed of the respective wheels for use in an ABS control, the rotation speed of each of the pairs of drive and driven wheels are detected. Then the data signals generated by the detection are low pass filtered and checked to determine if any of the rotation speeds detected with the driven wheels is larger than the largest of the filtered rotation speeds. Then the vehicle speed is determined from the filtered rotation speeds, excluding that or those of the driven wheel or wheels whose detected rotation speed is larger than the largest of the filtered rotation speeds.

3 Claims, 2 Drawing Sheets

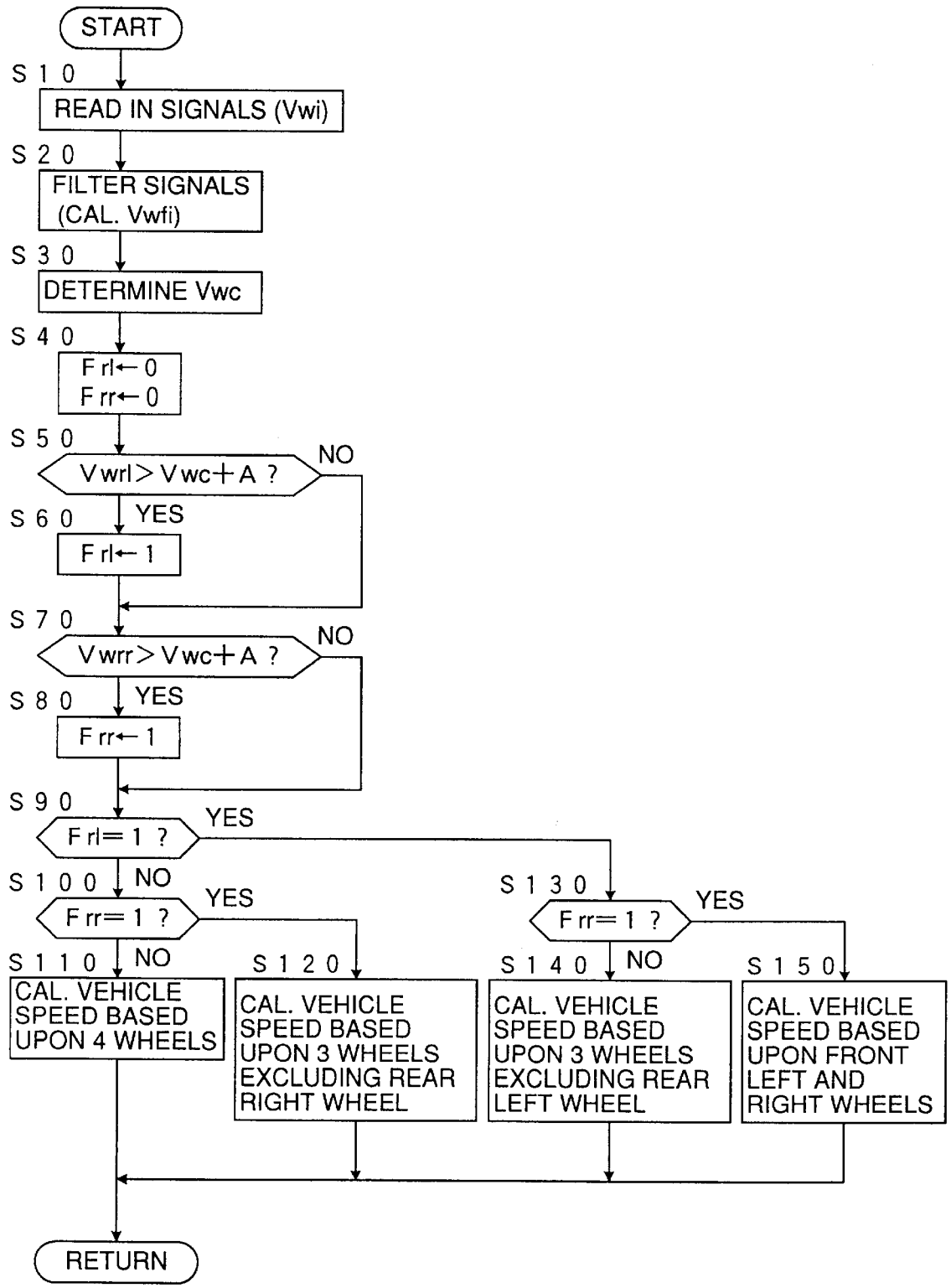

DEVICE FOR DETECTING VEHICLE SPEED OF FOUR-WHEELED VEHICLES FOR USE IN ABS

BACKGROUND OF THE INVENTION

1. Field of the Invention

The present invention relates to a device for detecting vehicle speed of a vehicle, particularly an ordinary four-wheeled automobile, for the purpose of providing a base of a due slipless rotation speed of the wheels for use in operating the so-called antilock brake system.

2. Description of the Prior Art

The antilock brake system (ABS) is already well known as a brake system of a vehicle such as an automobile which automatically decreases a braking force applied thereby to a wheel or wheels of the vehicle when the braked wheel starts to slip so much as to lose its gripping of the road surface due to an excessive braking force applied thereto.

In order for the antilock brake system to operate at a high appropriateness, it is essential that the vehicle speed, i.e. the running speed of the vehicle body, is correctly measured or estimated to provide the base of a due slipless rotation speed for the respective wheels, so that the slipping or locking condition of each braked wheel is correctly judged from a difference between the due slipless rotation speed and an actual rotation speed of the wheel. Unless the running speed of the vehicle body is directly detected by an expensive high technology device such as a supersonic or laser speed detector, the measurement thereof will have to depend on the measurement of the rotation speed of one or more of the wheels. However, since the rotation speed of each wheel is liable to deviate from such a due slipless rotation speed because of the applications of driving or braking torques thereto and/or irregularities of the road surface, there have been made various contrivances to derive the vehicle speed as correctly as possible from the rotation speeds detected with respect to all or some of the wheels of the vehicle, such as to select the highest or lowest value of them or to calculate a simple or a weighted mean value of some or all of them.

SUMMARY OF THE INVENTION

The inventor has first contemplated that, since the drive wheels of a vehicle such as an automobile are not being driven when the measurement of the vehicle speed for the purpose of operating the ABS is required, there should occur no traction slip in the drive wheels. Moreover since the drive wheels are generally still connected with its power system during such a vehicle speed measurement period, the virtual inertia of rotation of the drive wheels will be relatively large, and, therefore, the rotation speeds detected with respect to at least a pair of drive wheels of a four-wheeled automobile or the like will be effectively usable for estimating the vehicle speed for the above-mentioned purpose.

The inventor has further contemplated that in a front drive or rear drive type four-wheeled automobile, a pair of rear or front driven wheels, each having a relatively small inertia of rotation, will be relatively highly liable to a temporal increase of rotation speed when they roll over a convex or a concave surface of the road. Nevertheless, it will not be appropriate to completely neglect the rotation speeds of the driven wheels in operating the ABS, because in the four-wheeled automobiles the vehicle speed detected based based upon only a front pair of wheels and the vehicle speed deteced based upon only a rear pair of wheels are often so different from one another as to substantially affect a good performance of the ABS due to a turning of the vehicle and/or a change of load distribution between the front and rear wheels.

The present invention is based upon those matters contemplated with respect to the particularities of the conditions concerned with the operation of the ABS and the behaviors of the front or rear drive type four-wheeled vehicles like automobiles, and makes it a principal object to provide a more improved measurement of the vehicle speed for the purpose of operating the ABS of those vehicles.

In order to accomplish such a principal object, the present invention proposes a device for measuring vehicle speed of a vehicle such as an automobile, having a pair of front wheels and a pair of rear wheels, a power system for driving either the front pair or the rear pair of wheels, and an antilock brake system for selectively applying a braking force to the pair of front wheels and the pair of rear wheels with an antilock reducibility of the braking force, the device comprising:

means for detecting rotation speed of each of the front and rear pairs of wheels and generating corresponding first stage electric signals each bearing the detected rotation speed;

means for filtering the first stage electric signals for removing a high frequency component therefrom and generating corresponding filtered second stage electric signals;

means for processing the first and second stage electric signals so as to judge if the rotation speed of any of the first stage electric signals with regard to the driven wheels is larger than the largest of the rotation speeds of the second stage electric signals and identifying such a first stage electric signal or signals to be exceptional; and means for generating an electric signal indicating a vehicle speed for use in operating the antilock brake system based upon all of the second stage electric signals, excluding one or more thereof corresponding to the exceptional electric signal or signals.

By the device of the above-mentioned construction, when the vehicle is a front or rear drive type vehicle or a four-wheel drive type vehicle operated in a front or rear drive mode, the rotation speeds detected with respect to the four wheels are usually all effectively considered in determining the vehicle speed for use in operating the ABS, whereas if one or both of the pair of driven wheels roll over a convex or a concave portion of a road so as to temporarily increase their rotation speed during the operation of the ABS, the unduly increased rotation speed of the one or both of the driven wheels is excluded only in the meantime from engaging in the determination of the vehicle speed for use in operating the ABS.

In the device of the above-mentioned basic construction, the vehicle speed indication signal generation means may generate the vehicle speed indication signal so as to indicate the vehicle speed to correspond to the largest of the rotation speeds of all the second stage electric signals, excluding the one or more thereof corresponding to the exceptional electric signals or signals.

Since the ABS is operated by judging the braking condition of each wheel based upon a difference between a due slipless rotation speed of the wheel corresponding to the vehicle speed and the actual rotation speed of the wheel, it will be a desirable selection to determine the vehicle speed to correspond to the largest of the rotation speeds available, under the provision that the drive wheels are not in the meantime being driven by the power system, while the rotation speed detected with a driven wheel is excluded if the driven wheel is guessed to have been temporarily accelerated by rolling over a convex or a concave portion of the road surface.

In the device of the above-mentioned construction, the first and second stage electric signals processing means may be constructed to judge if the rotation speed of any of the first stage electric signals with regard to the driven wheels is larger than the largest of the rotation speeds of the second stage electric signals beyond a predetermined allowance to identify the exceptional electric signal or signals.

By such an arrangement, the magnitude of a convex or a concave portion of the road surface to which the device of the present invention is to react is adjusted by an appropriate selection of the magnitude of the allowance.

BRIEF DESCRIPTION OF THE DRAWINGS

In the accompanying drawings,

FIG. 2 is a flowchart showing the operation of the vehicle speed measuring device of FIG. 1.

DESCRIPTION OF THE EMBODIMENT

Figure 1:
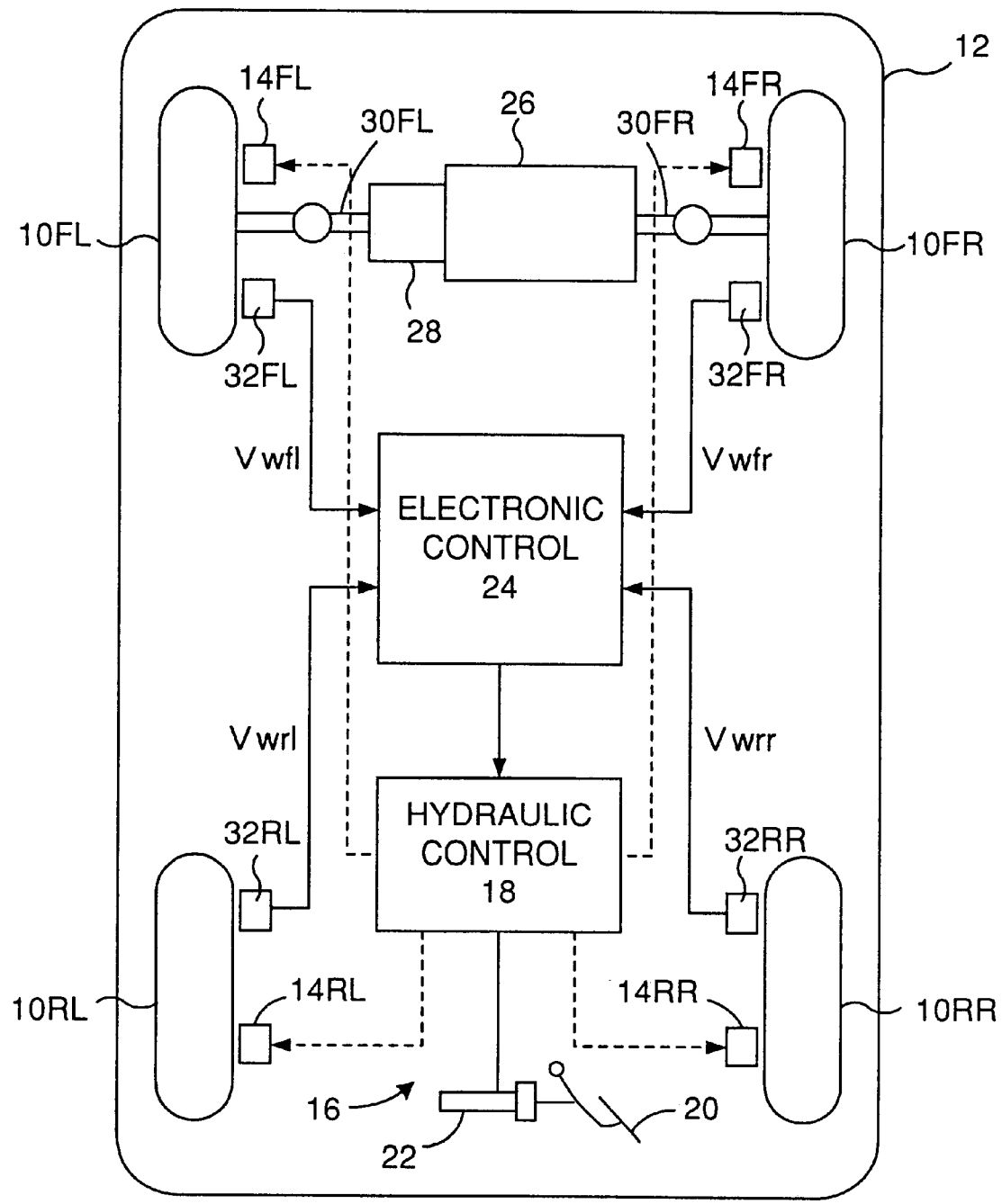
FIG. 1 is a diagrammatical illustration of a four-wheeled vehicle incorporating an embodiment of the vehicle speed measuring device of the present invention.

In the following, the present invention will be described in more detail in the form of a preferred embodiment with reference to the accompanying drawings.

Referring to FIG. 1, a four-wheeled vehicle or automobile therein diagrammatically shown has front left, front right, rear left and rear right wheels designated by 10FL, 10FR, 10RL and 10RR, respectively, and a vehicle body 12. The wheels 10FL, 10FR, 10RL and 10RR are each adapted to be braked by an antilock brake system including wheels cylinders 14FL, 14FR, 14RL and 14RR each corresponding thereto, manual control part 16, a hydraulic control part 18, and an electronic control part 24. The manual control part 16 includes a brake pedal 20 adapted to be depressed by a driver (not shown), and a master cylinder 22 for converting a depression of the brake pedal by the driver into a hydraulic pressure supplied to the wheel cylinders via the hydraulic control part 18. The hydraulic control part 18 includes a hydraulic circuit incorporating electrically operated valves (not shown) adapted to be actuated under the control operation of the electronic control part 24 which is substantially a micro-computer of an ordinary construction. Since such a manual/automatic brake system of four-wheeled automobiles is well known in the art, and since the ABS is incorporated in such a well known manual/automatic brake system, and further since the present invention does not relate to the constructional details of such a brake system or the ABS, more detailed descriptions about the constructions of the brake system will be omitted to avoid a redundancy of the descriptions of the specification.

In the shown embodiment, the vehicle is a front drive type four-wheeled vehicle. The front left and front right wheels 10FL and 10FR are adapted to be driven by an engine 26 via a transmission 28 and universal type front left and front right axles 30FL and 30FR, respectively.

Further, rotation speeds of the front left, front right, rear left and rear right wheels 10FL, 10FR, 10RL and 10RR are detected by rotation speed sensors 32FL, 32FR, 32RL and 32RR, respectively, so that the output signals bearing the respective detected rotation speeds are supplied to the electronic control part 24.

Now, the construction of the device for measuring vehicle speed according to the present invention will be described in the form of its operation by referring to the flowchart of FIG. 2, because the device of the invention is indeed substantially constructed by the functions of the micro-computer forming the electronic control part 24.

As usual in this kind of art, the operations throught the flowchart of FIG. 2 are repetitively carried out at a predetermined cycle time such as tens of microseconds when the ignition switch (not shown) of the vehicle is closed.

In step 10, the signals bearing each rotation speed $Vwi$ (i representing front left (fl), front right (fr), rear left (rl) and rear right (rr) of the four wheels) are read in by the electronic control part 24 from the rotation speed sensors 32FL–32RR.

In step 20, the signals are filtered by appropriate filtering means not shown but incorporated in the electronic control part 24, so as to remove high frequency components therefrom according to a predetermined threshold frequency value set therein. Such an art of low pass filtering is generally well known. The wheel rotation speeds born by the filtered signals are denoted $Vwfi$, wherein i represents the front left, front right, rear left and rear right as described above.

In step 30, the largest of $Vwfi$ is determined to be $Vwc$.

In step 40, flags Frl and Frr concerned with the rear left and rear right wheels (driven wheels) are set to zero.

In step 50, it is judged if $Vwrl$, i.e. the rotation speed of the rear left wheel just as read in from the rotation speed sensor 32RL, is larger than $Vwc+A$, wherein A is an appropriate allowance for discriminating that the rear left wheel is rolling over a convex or a concave portion of the road surface of an extent larger than a limit to be an object for actuation of the present invention. The A may be zero in an extreme case. When the answer is yes, the control proceeds to step 60, and the flag Frl is set to 1, whereas when the answer is no, the control bypasses step 60.

In step 70, similarly as in step 50, it is judged if $Vwrr$, i.e. the rotation speed of the rear right wheel just as read in from the rotation speed sensor 32RR, is larger than $Vwc+A$. When the answer is yes, the control proceeds to step 80, and the flag Frr is set to 1, whereas when the answer is no, the control bypasses step 80.

In step 90, it is judged if the flag Frl is 1. When the answer is no, the control proceeds to step 100.

In step 100, it is judged if the flag Frr is 1. When the answer is no, the control proceeds to step 110.

In step 110, the vehicle speed for use in operating the ABS, i.e. the vehicle speed for checking how the rotation speeds of the respective wheels under a braking are lower than the due slipless rotation speed corresponding to the vehicle speed, is calculated based upon all the four wheels. As a desirable embodiment, the vehicle speed may be calculated to be the same as the largest of $Vwfi$ of the four wheels. As an alternative, the vehicle speed may be calculated as a mean value of all $Vwfi$. Other calculations will be possible.

When the answer of step 100 is yes, the control proceeds to step 120, and the vehicle speed for use in operation the ABS is calculated based upon the three wheels, excluding the rear right wheel. Also as a desirable embodiment, the vehicle speed may be calculated to be the same as the largest of $Vwfi$ of those three wheels. Similarly, as an alternative, the vehicle speed may be calculated as a mean value of the three $Vwfi$. Other calculations will be possible.

When the answer of step 90 is yes, the control proceeds to step 130, and it is judge if the flag Frr is 1. When the answer is no, the control proceeds to step 140, and the vehicle speed for use in operating the ABS is calculated based upon the three wheels, excluding the rear left wheel. Also as a desirable embodiment, the vehicle speed may be calculated to be the same as the largest of Vwfi of those three wheels. Similarly, as an alternative, the vehicle speed may be calculated as a mean value of the three Vwfi. Other calculations will be possible.

When the answer of step 130 is yes, the control proceeds to step 150, and the vehicle speed for use in operating the ABS is calculated based upon the front left and right wheels, because it is guessed that the rear wheels serving as a driven wheel and having a relatively small inertia of rotation are both being temporarily accelerated by rolling over a convex or a concave portion of a road of an extent beyond a limit such as described above. Such a convex or a concave portion of a road will also be rolled over by the front wheels serving as a drive wheel which, however, would generally be kept in connection with the transmission 28 and the engine 26 so as not to be much less temporarily accelerated by such a convex or concave portion of the road surface. In this case, also, as a desirable embodiment, the vehicle speed may be calculated to be the same as the largest of Vwfi of the front wheels. As an alternative, the vehicle speed may be calculated as a mean value of them. Other calculations will also be possible.

Thus, it will be appreciated that according to the present invention the vehicle speed to provide the base of the due slipless rotation speed of the respective wheels in the ABS control is more properly estimated from the data of the wheel speed sensors by obviating an error due to the driven wheels being temporarily accelerated when they roll over a convex or a concave portion of the road surface.

Although the present invention has been described in detail with respect to a preferred embodiment thereof, it will be apparent for those skilled in the art that various modifications are possible with respect to the shown embodiments within the scope of the present invention.

What is claimed is:

1. A device for measuring vehicle speed of a vehicle such as an automobile having a pair of front wheels and a pair of rear wheels, a power system for driving either the front pair or the rear pair of wheels, and an antilock brake system for electively applying a braking force to the pair of front wheels and the pair of rear wheels with an antilock reducibility of the braking force, the device comprising:

means for detecting rotation speed of each of the front and rear pairs of wheels and generating corresponding first stage electric signals each bearing the detected rotation speed;

means for filtering the first stage electric signals for removing a high frequency component therefrom and generating corresponding filtered second stage electric signals;

means for processing the first and second stage electric signals so as to judge if the rotation speed of any of the first stage electric signals with regard to the driven wheels is larger than the largest of the rotation speeds of the second stage electric signals and identifying such a first stage electric signal or signals to be exceptional; and means for generating an electric signal indicating a vehicle speed for use in operating the antilock brake system based upon all of the second stage electric signals, excluding one or more thereof corresponding to the exceptional electric signal or signals.

2. A device according to claim 1, wherein the vehicle speed indication signal generation means generate the vehicle speed indication signal so as to indicate the vehicle speed to correspond to the largest of the rotation speeds of all the second stage electric signals, excluding the one or more thereof corresponding to the exceptional electric signal or signals.

3. A device according to claim 1, wherein the first and second stage electric signals processing means judge if the rotation speed of any of the first stage electric signals with regard to the driven wheels is larger than the largest of the rotation speeds of the second stage electric signals beyond a predetermined allowance to identify the exceptional electric signal or signals.

* * * * *